US012100882B2

(12) United States Patent
Blanco

(10) Patent No.: US 12,100,882 B2
(45) Date of Patent: Sep. 24, 2024

(54) CAVITY FILTERS AND FILTER MODULES THEREFOR

(71) Applicant: Telefonaktiebolaget LM Ericsson (publ), Stockholm (SE)

(72) Inventor: Darwin Blanco, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 17/802,987

(22) PCT Filed: Mar. 11, 2021

(86) PCT No.: PCT/SE2021/050215

§ 371 (c)(1),
(2) Date: Aug. 29, 2022

(87) PCT Pub. No.: WO2021/183034

PCT Pub. Date: Sep. 16, 2021

(65) Prior Publication Data

US 2023/0111963 A1 Apr. 13, 2023

Related U.S. Application Data

(60) Provisional application No. 62/989,017, filed on Mar. 13, 2020.

(51) Int. Cl.
*H01P 1/208* (2006.01)
*H01P 1/205* (2006.01)
(Continued)

(52) U.S. Cl.
CPC ............ *H01P 7/065* (2013.01); *H01P 1/2053* (2013.01); *H01P 1/208* (2013.01); *H01P 7/10* (2013.01)

(58) Field of Classification Search
CPC ........ H01P 1/207; H01P 1/208; H01P 1/2082; H01P 1/2084; H01P 1/2086; H01P 1/212;
(Continued)

(56) References Cited

U.S. PATENT DOCUMENTS

2006/0197631 A1 * 9/2006 Pance .................. H01P 1/2084 333/202

FOREIGN PATENT DOCUMENTS

DE 3047466 A1 7/1982

OTHER PUBLICATIONS

Basavarajappa, et al., "Design Methodology of a High-Q Tunable Coaxial Filter and Diplexer," IEEE Transactions on Microwave Theory and Techniques, vol. 67, Issue 12, Dec. 2019, pp. 5005-5015.

(Continued)

*Primary Examiner* — Stephen E. Jones
(74) *Attorney, Agent, or Firm* — Withrow & Terranova, PLLC

(57) ABSTRACT

The disclosure provides a filtering module for a cavity filter having a housing defining an enclosed cavity, wherein a surface of the cavity is electromagnetically conductive; and a plurality of planar resonators arranged within the cavity, one or more of the resonators being rotatable about an axis of rotation so as to vary an electric-field coupling between the resonator and other resonators of the plurality of resonators. The disclosure also provides a cavity filter having an input for receiving a signal to be filtered; a plurality of filtering modules, each filtering module comprising: a cavity, wherein a surface of the cavity is electromagnetically conductive; and a plurality of resonators arranged within the cavity, at least one of the resonators being movable so as to vary an electromagnetic coupling between the resonator and other resonators of the plurality of resonators; and an output for outputting a filtered signal.

19 Claims, 5 Drawing Sheets

(51) Int. Cl.
*H01P 7/06* (2006.01)
*H01P 7/10* (2006.01)

(58) Field of Classification Search
CPC .......... H01P 1/202; H01P 1/20; H01P 1/2053; H01P 7/10; H01P 7/105
See application file for complete search history.

(56) References Cited

OTHER PUBLICATIONS

Fiedziuszko, et al., “Dielectric Resonators: Raise Your High-Q,” IEEE Microwave Magazine, Sep. 2001, pp. 51-60.
Snyder, et al., “Present and Future Trends in Filters and Multiplexers,” IEEE Transactions on Microwave Theory and Techniques, vol. 63, Issue 10, Oct. 2015, pp. 3324-3360.
Tkadlee, et al., “Pseudoelliptic Combline Filter in a Circularly Shaped Tube,” International Microwave Symposium, Jun. 2018, IEEE, pp. 1099-1102.
International Search Report and Written Opinion for International Patent Application No. PCT/SE2021/050215, mailed Jun. 7, 2021, 13 pages.
Examination Report for European Patent Application No. 21712270.4, mailed Apr. 30, 2024, 8 pages.

* cited by examiner

CAVITY FILTERS AND FILTER MODULES THEREFOR

This application is a 35 U.S.C. § 371 national phase filing of International Application No. PCT/SE2021/050215, filed Mar. 11, 2021, which claims the benefit of provisional patent application Ser. No. 62/989,017, filed Mar. 13, 2020, the disclosures of which are incorporated herein by reference in their entireties.

TECHNICAL FIELD

Embodiments of the disclosure relate to cavity filters, and particularly to radio-frequency or microwave cavity filters, component parts of such cavity filters, and wireless transmission and reception apparatuses comprising such cavity filters.

BACKGROUND

Cavity filters at low frequencies (e.g., microwaves) are known for being expensive, heavy and bulky devices. The challenge in microwave filter design is to find a realizable topology that minimizes the number of resonators and satisfies the specification mask for the particular application (e.g., in terms of attenuation, phase group distortion, etc.). Often, the goal is to reduce the total volume of the filter, while keeping high performance at the lowest possible cost.

Most of the time the filter mask does not require the same level of attenuation in both rejection bands of a passband filter, and therefore there is an increasing interest in using elliptical functions for communication applications because they can create bandpass filters with asymmetrical rejection bands. This capability to introduce arbitrary transmission zeros before and/or after the transmission band allows the design to be customized for a particular desired mask. This flexibility can be translated into a reduction in the number of required resonators and, thus, the size and weight of the filter.

To produce a transmission zero, it is usually necessary to create cross-coupling between non-adjacent resonators, creating an alternative path where electromagnetic energy can flow through the device (from the input port to the output port). In other words, one resonator is coupled to at least two other resonators. This fact normally suggests geometries that are not inline and are difficult to generate, for example, in a combline filter. One successful inline and combline filter that can synthesize pseudo-elliptical responses was introduced by Macchiarella et al (R. Tkadlec and G. Macchiarella, "*Pseudoelliptic Combline Filter in a Circularly Shaped Tube,*" 2018 *IEEE/MTT*-S International Microwave Symposium-IMS, Philadelphia, PA, 2018, pp.

The ratio between the volume of the resonator and its quality factor also has an impact on the final weight and size of the filter. A considerable reduction in the filter volume has been demonstrated using either multiple modes with the same resonator or new materials with high dielectric permittivity, such as ceramic materials. See, a paper by S. J. Fiedziuszko and S. Holmes ("Dielectric resonators raise your high-Q," in *IEEE Microwave Magazine*, vol. 2, no. 3, pp. 50-60, September 2001).

SUMMARY

One inline combline filter that can synthesize pseudo-elliptical responses was introduced by Macchiarella et al, as noted above. The cross-coupling between non-adjacent resonators was created by misaligning the resonator axes. The complexity of the design is simple for three poles but increases with the order of the filter. The reported approach assumes that there is no coupling between two non-adjacent resonators, if there are at least two resonators between them (for example resonators 1 and 4 of an inline geometry). However, the design becomes very complex when the number of resonators increases (which is common for example in base stations and mobile communications). Besides, there is always spurious coupling for distant resonators that is difficult to neglect in a tuning stage.

Separately, 3D resonator geometries are commonly used to obtain high Q-values, leading to the high volume/weight issue noted above. A considerable reduction in the volume has been demonstrated using multiple modes for the same resonator. However, it can be difficult to tune these modes independently and to compensate for thermal expansion when power is applied. Thus, using single mode or dual mode (same identical mode but orthogonal) resonators normally leads to a simpler realization of the filter (design and tuning) with respect to a greater number of modes.

Summarizing, new filter topologies (that reduce the number of resonators) with high-Q values and/or small size would be beneficial to reduce the weight and the size of a filter solution. Moreover, a reduction in the dimension and/or complexity of the resonators is also appealing to simplify production and reduce cost.

Embodiments of the disclosure seek to address these and other problems.

In a first aspect, there is provided a cavity filter, comprising: an input for receiving a signal to be filtered; a plurality of filtering modules, each filtering module comprising: a cavity, wherein a surface of the cavity is electromagnetically conductive; and a plurality of resonators arranged within the cavity, at least one of the resonators being movable so as to vary an electromagnetic coupling between the resonator and other resonators of the plurality of resonators; and an output for outputting a filtered signal. An input filtering module of the plurality of filtering modules is coupled to the input to receive the signal to be filtered, and an output filtering module of the plurality of filtering modules is coupled to the output and is configured to provide the filtered signal. Each of the filtering modules is coupled to at least one other filtering module of the plurality of filtering modules via a magnetic coupling.

Cavity filters according to the first aspect have the advantage of enabling the overall filter performance to be synthesized and predicted straightforwardly using commercial software. Only the electric coupling between resonators in the same filtering module requires more complex calculation. Filter performance can be changed by adding or removing filtering modules (thus adding or removing a transmission zero) in a predictable way.

In more detail, the modular design methodology allows very high number of poles as the design is split out in pluralities (e.g., triplets) of resonators. Each of these pluralities is physically and electrically separated from non-adjacent pluralities, while a magnetic coupling between adjacent triplets creates the isolation to avoid spurious coupling. Electrical cross-coupling between each of the resonators in a plurality of resonators creates a transmission zero allowing the creation of an asymmetrical filter mask, while reducing the total number of required resonators. Moreover, because the modularity is based on triplets of resonators in some embodiments, it is possible to produce any filter order based on only three planar layers.

In a second aspect, there is provided a filtering module for a cavity filter, the filtering module comprising: a housing defining an enclosed cavity, wherein a surface of the cavity is electromagnetically conductive; and a plurality of planar resonators arranged within the cavity, one or more of the resonators being rotatable about an axis of rotation so as to vary an electric-field coupling between the resonator and other resonators of the plurality of resonators.

Filtering modules according to the second aspect have the technical advantage of a lower weight and/or a lower volume than conventional filters. Further, the planar resonators provide greater accuracy than three-dimensional resonators, and at lower cost.

A further reduction in weight and/or volume is achieved through a planar resonator printed over a low-loss, dense dielectric substrate. The weight is decreased substantially due to the size reduction of the planar resonators. Further, the solution is extremely versatile as the Q-value of the resonator can be controlled by varying the thickness of the ceramic substrate.

When embodiments of the first and second aspects are combined, the hybrid approach of new resonators and a complex but modular topology leads to a low size, high Q values, low profile and low-cost filters. Single-mode resonators allows use of an inline but misaligned geometry that reduces the volume. The Q-value is easily tuned depending on the application, from 1000 to more than 5000 or more than 10000, making embodiments of the disclosure suitable for a broad range of the applications (where asymmetrical specifications are permitted or desired) but especially suitable for sub-6 GHz filter solutions.

A third aspect provides a wireless transmission and reception apparatus (such as a base station) comprising a cavity filter or filtering module as described above.

DETAILED DESCRIPTION

Embodiments of the disclosure provide solutions to both problems identified above.

One aspect of the disclosure provides a cavity filter in which a large number of resonators is split into multiple filtering modules. Each filtering module comprises a plurality of resonators arranged within a cavity, such that the resonators within one filtering module are electrically decoupled from the resonators within other filtering modules. The filtering modules are magnetically coupled to each other, such that signals are passed magnetically from one filtering module to another, e.g., in an inline topology.

Each filtering module may provide its own transmission zero. Thus, by providing the resonators of the filter in multiple filtering modules, each with their own cavity, this aspect of the disclosure permits higher-order filtering which is easy to tune and design.

A second aspect of the disclosure provides a filter design with low weight and/or low volume. According to this aspect, multiple planar (e.g., two-dimensional) resonators are provided within a cavity. At least one of the resonators is rotatable about an axis of rotation so as to vary an electric-field coupling between the resonator and other resonators within the cavity. By making the resonators planar, the filter can be much more compact than previous designs which rely on three-dimensional resonators.

According to this aspect, one of more of the resonators may comprise a dielectric substrate (e.g., a low loss and dense dielectric such as ceramic) with an electrically conductive track thereon. These planar resonators are expected to provide better accuracy than three-dimensional resonators, and at a lower cost. The combination of a planar and electrically conductive track with a low loss and high permittivity dielectric substrate provides very high Q-values.

The first and second aspects of the disclosure may be implemented in the same cavity filter structure, and the embodiments described below include both aspects. However, those skilled in the art will appreciate that the first and second aspects may also be implemented independently of each other. That is, the first aspect provides a cavity filter which is easy to tune and design through its use of multiple filtering modules. Such filtering modules may include the planar resonators of the second aspect (and thus also benefit from reduced weight and/or volume), or resonators having a different design. Similarly, the second aspect provides a filtering module having a cavity which includes planar resonators and thus helps to reduce the weight and/or volume of the filter. This design may be incorporated in the modular design of the first aspect, as one or more of the multiple filtering modules, or on its own in a cavity filter having only a single cavity.

Figure 1:
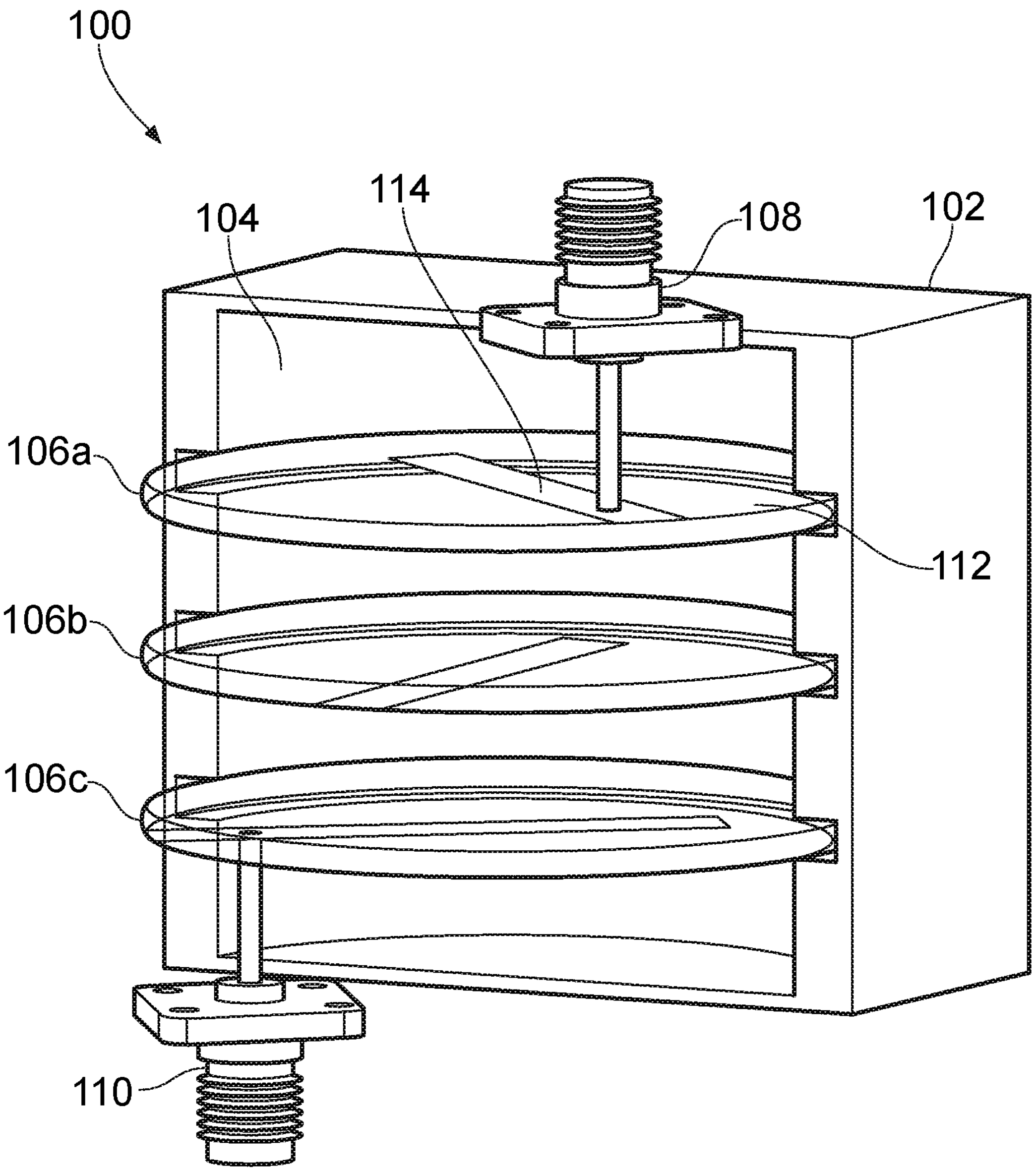
FIG. 1 shows a cavity filter according to embodiments of the disclosure.

FIG. 1 shows a cavity filter 100 according to embodiments of the disclosure.

The filter comprises a housing 102, which defines an internal cavity or enclosure 104. The cavity 104 may be milled from the material belonging to the housing 102, for example, or the housing 102 may be constructed (e.g., through three-dimensional printing or other processes) directly with the cavity 104 already defined within it.

The external shape of the housing 102 itself may take any convenient shape. In the illustrated embodiment, for example, the external shape of the housing is 102 is cuboid.

To reduce the weight of the overall filter, the housing 102 may be manufactured from a lightweight material, such as plastic. A surface of the housing 102, and particularly an internal surface of the cavity 104, is electromagnetically conductive such that electromagnetic fields are contained within the cavity 104. For example, the surface may be coated in a conductive material such as a metal (e.g., silver).

Arranged within the cavity 104 are a plurality of resonators **106*a*, 106*b*, 106*c* (collectively 106). In one embodiment, the plurality of resonators 106 includes at least three resonators. In this way, the plurality of resonators 106 is able to generate a transmission zero in the filtering performance of the filter 100. In a further embodiment (and in the illustrated embodiment), the plurality of resonators 106 consists of three resonators. In this way, the plurality of resonators 106** has a filtering performance comprising a single transmission zero and three poles.

The filter 100 further comprises an input port 108 and an output port 110. The input and output ports 108, 110 may comprise connectors for coaxial transmission lines as illustrated or any other suitable connector for transferred electromagnetic wave energy, typically in the radio and microwave parts of the spectrum, into the cavity 104 (for the input port 108) and out of the cavity 104 (for the output port 110). At least one of the resonators 106*a* is coupled directly to the input port 108 for receiving an input electromagnetic signal to be filtered. For example, a direct conductive connection may be provided between the input port 108 and a conductive track of the input resonator 106*a* (see below). At least one of the resonators 106*c* is coupled directly to the output port 110 for outputting a filtered output electromagnetic signal. For example, a direct conductive connection may be provided between the output port 110 and a conductive track of the output resonator 106*c* (see below).

Each resonator 106 comprises a dielectric substrate 112 and an electrically conductive track 114 supported by the substrate. The conductive track may be positioned anywhere suitable on the substrate. For example, the conductive track 114 may be positioned on a surface of the substrate (as illustrated) or embedded within the substrate.

According to embodiments of the disclosure, the substrate 112 is planar, or substantially two-dimensional. That is, the substrate 112 is relatively thin in one dimension and relatively thick in the other two dimensions. For example, the substrate may be at least five times thicker in two dimensions than in the third dimension; in another example, the substrate 112 may be at least ten times thicker in two dimensions than in the third dimension.

The substrate 112 may be manufactured from a relatively dense dielectric material, having a relatively high electric permittivity, such as ceramic. In this way, the substrate 112 both supports the conductive track 114 reliably and condenses the magnetic field around the resonator 106. The Q-value of the resonator 106 is increased for a fixed length of the track 114 or, in other words, the track length can be reduced for a fixed Q-value. This hybrid approach that combine a metal resonator with a high dielectric substrate provides a significant reduction of the filter size. The Q-value can be defined by the losses in the dielectric substrate and the thickness of the substrate.

The conductive track 114 of each resonator 106 comprises an elongate area of electrically conductive material, e.g., a metal such as silver. In the illustrated embodiment, each track is identical and comprises a single rectangle of conductive material (i.e., the tracks comprise a single straight line). This provides a single mode of electromagnetic excitation for each resonator 106. In alternative embodiments, the tracks for each resonator 106 within a cavity 104 may have different shapes, and include features such as areas which are wider than other parts of the track, curves or corners, e.g., such that the current distribution is tapered for better power handling. The length of the track 114 is chosen depending on the desired Q value and the permittivity of the substrate 112.

Each conductive track 114 has a first end which is electrically unconnected (i.e. open circuit) and a second end which is electrically connected to the inner surface of the cavity 104. That is, the second ends of each conductive track 114 are effectively grounded to the housing 102. To effect this connection, and also to provide structural support for the resonators 106 within the cavity 104, each resonator 106 sits in a respective groove provided on the inner surface of the cavity 104. The conductive track 114 extends to a periphery of the substrate 112 such that the second end of each conductive track 114 comes into contact with the inner surface of the cavity 104 at, near or within the groove.

In the illustrated embodiment, the cavity 104 is cylindrical; however, those skilled in the art will appreciate that alternative shapes are possible. Varying the shape of the cavity 104 will affect the filtering effect of the cavity filter 100; however, this can be modelled and may not be disadvantageous. For example, different cavity shapes may help to achieve a desired filtering performance, depending on the design specification of the filter.

Further, the plurality of resonators 106 are arranged coaxially within the cavity 104. This arrangement of planar, coaxial resonators provides a compact design which is both low weight and low volume. In the illustrated embodiment, where the cavity 104 is cylindrical, each substrate 112 has a circular disc shape which is aligned with the longitudinal axis of the cylinder. However, as noted above, alternative cavity shapes and substrate shapes are possible.

According to embodiments of the disclosure, at least one of the resonators 106 is rotatable about an axis of rotation so as to vary an electric-field coupling between that resonator and other resonators within the cavity 104. For example, the at least one resonator 106 may be rotatable by provision of a physical mechanism on the housing 102 (not illustrated), coupled to an indexing system which permits the rotational position of the at least one resonator to be determined reliably from outside the housing 102.

The axis of rotation of the at least one resonator 106 may correspond to or be aligned with an axis of the cavity 104 (such as, in the illustrated embodiment, the longitudinal axis of a cylindrical cavity).

In this way, the resonators 106 within the cavity 104 are misaligned (e.g., such that at least one of the conductive tracks 114 points in a different direction to the others). Each resonator 106 has an electric-field coupling to multiple other resonators within the cavity. That is, the input resonator 106*a* has an electric-field coupling to the other resonators 106*b* and 106*c*; the intermediate resonator 106*b* has an electric-field coupling to the input and output resonators 106*a* and 106*c*; and the output resonator 106*c* has an electric-field coupling to the input and intermediate resonators 106*a* and 106*b*. Those skilled in the art will appreciate that fine tuning of the resonant frequency of the filter 100 and also the cross-coupling between resonators 106 can be achieved through use of conventional tuners (depending on the fabrication tolerances and if required for the particular application).

In one embodiment, each of the resonators 106 within the cavity 104 are rotatable in this way. In other embodiments, each of the resonators 106 within the cavity 104, with the exception of the input and output resonators 106*a*, 106*c*, is rotatable. In this way, the direct connection between those input and output resonators and the input and output ports 108, 110 can be maintained straightforwardly.

The cavity filter 100 thus corresponds to the second aspect described above, and provides a low volume, low weight filter.

Figure 2:
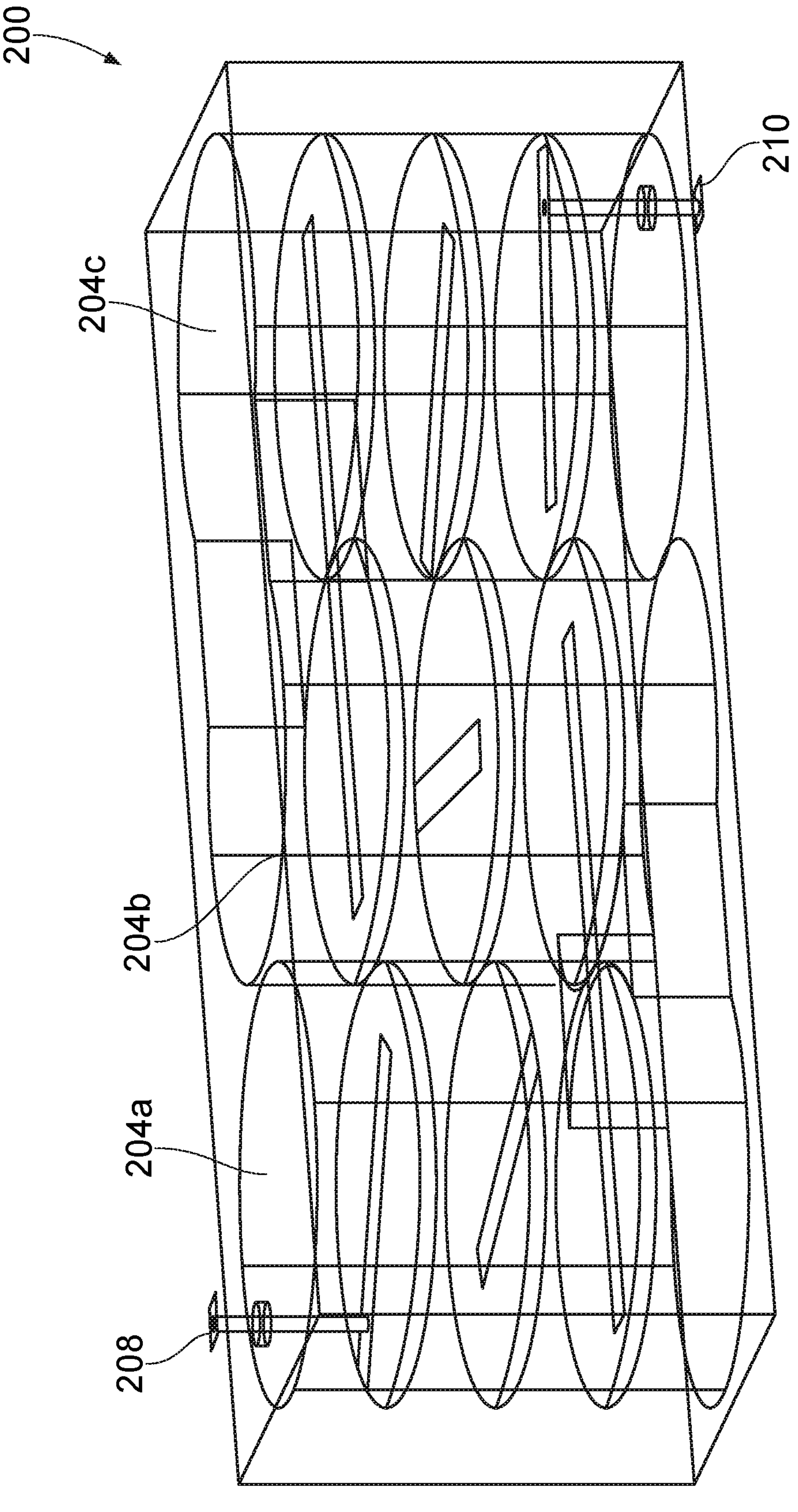
FIGS. 2 and 3 show cavity filters according to embodiments of the disclosure.
Figure 3:
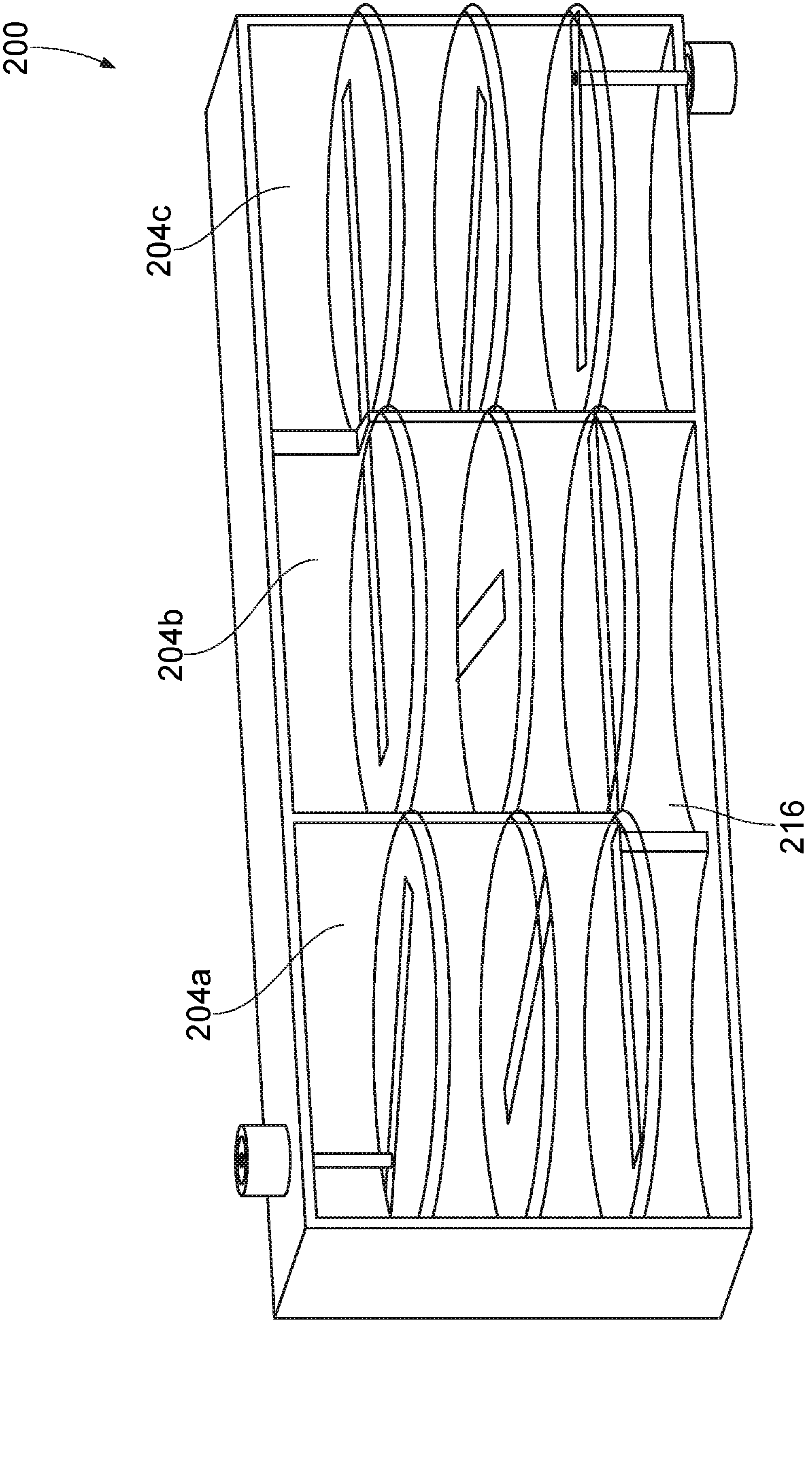

FIG. 2 shows a cavity filter 200 according to further embodiments of the disclosure, and particularly a cavity filter corresponding to both first and second aspects described above. The housing of the filter 200 is shown in outline only. FIG. 3 shows the same cavity filter 200 according to embodiments of the disclosure, in which the housing is illustrated in more detail.

According to embodiments of the disclosure, the cavity filter 200 comprises a plurality of filtering modules 204*a*, 204*b*, 204*c* (collectively 204). In the illustrated embodiment, the filter 200 comprises three filtering modules, but any number of two or more filtering modules may be provided according to embodiments of the disclosure. As will be apparent from the description below, filtering modules may be added or removed so as to vary the overall performance of the filter to add or remove transmission zeros and poles.

In the illustrated embodiment, the plurality of filtering modules 204 comprise an input filtering module 204*a*, an intermediate filtering module 204*b* and an output filtering module 204*c*.

Each filtering module 204 comprises a cavity and a plurality of resonators. In the illustrated embodiment, the cavity and resonators are substantially as described above with respect to FIG. 1. In other embodiments, however, the resonators may take a different form from the planar resonators 106 described above. For example, the resonators may be three-dimensional, and/or movable in different ways to the rotation described above (e.g., through translation).

The resonators within each filtering module 204 are electrically isolated from the resonators of other filtering modules by virtue of the conductive inner surface of the cavities. However, according to embodiments of the disclosure, adjacent filtering modules are magnetically coupled to each other via a window or aperture 216 provided in the wall between the cavities of those filtering modules, and particularly between an output resonator of the first filtering module and an input resonator of the second filtering module. Magnetic coupling between those output and input resonators can be increased by aligning the resonators (e.g., aligning the conductive tracks), such that the resonators are oriented in the same or substantially the same direction.

In the illustrated embodiment, the filter 200 comprises a single housing which defines the multiple cavities of the multiple filtering modules 204. However, it will be apparent that multiple housings may be provided, each defining one or more of the multiple cavities.

An input filtering module 204*a* receives an input signal from an input port 208 (e.g., a coaxial connector, as described above) connected directly to an input resonator of the input filtering module 204*a*. The resonators of the input filtering module are misaligned, as described above, to create an electric cross-coupling between those resonators and a corresponding transmission zero in the filtering performance of the input filtering module.

An output resonator of the input filtering module 204*a* is located adjacent to an aperture 216 in the housing between the cavity of the input filtering module 204*a* and the cavity of the intermediate filtering module 204*b*. The output resonator is substantially aligned with an input resonator of the intermediate filtering module 204*b*, so as to provide a maximal magnetic coupling between those resonators. Those skilled in the art will also appreciate that the resonators may be misaligned to an extent, with a corresponding reduction in the magnetic coupling.

Thus the input resonator of the intermediate filtering module 204*b* is excited, and the electric cross-coupling between the resonators of the intermediate filtering module 204*b* creates a second transmission zero in the overall performance of the filter 200.

An output resonator of the intermediate filtering module 204*b* is located adjacent to an aperture 216 in the housing between the cavity of the intermediate filtering module 204*b* and the cavity of the output filtering module 204*c*. Again, the output resonator is substantially aligned with an input resonator of the output filtering module 204*c*, so as to provide a maximal magnetic coupling between those resonators, but those skilled in the art will appreciate that the resonators may be misaligned to an extent as described above.

Thus the input resonator of the output filtering module 204*c* is excited, and the electric cross-coupling between the resonators of the output filtering module 204*c* creates a third transmission zero in the overall performance of the filter 200. An output resonator of the output filtering module 204*c* (and particularly a conductive track thereof—see above) is coupled to an output port 210 (e.g., a coaxial connector, as described above), to output the filtered signal from the filter 200.

The cavity filter 200 comprises nine resonators arranged into electrically isolated groups of three. Accordingly the filter 200 has nine poles and three transmission zeros. However, those skilled in the art will appreciate how the number of poles and transmission zeros may be straightforwardly increased or decreased by adding or removing filtering modules.

Figure 4:
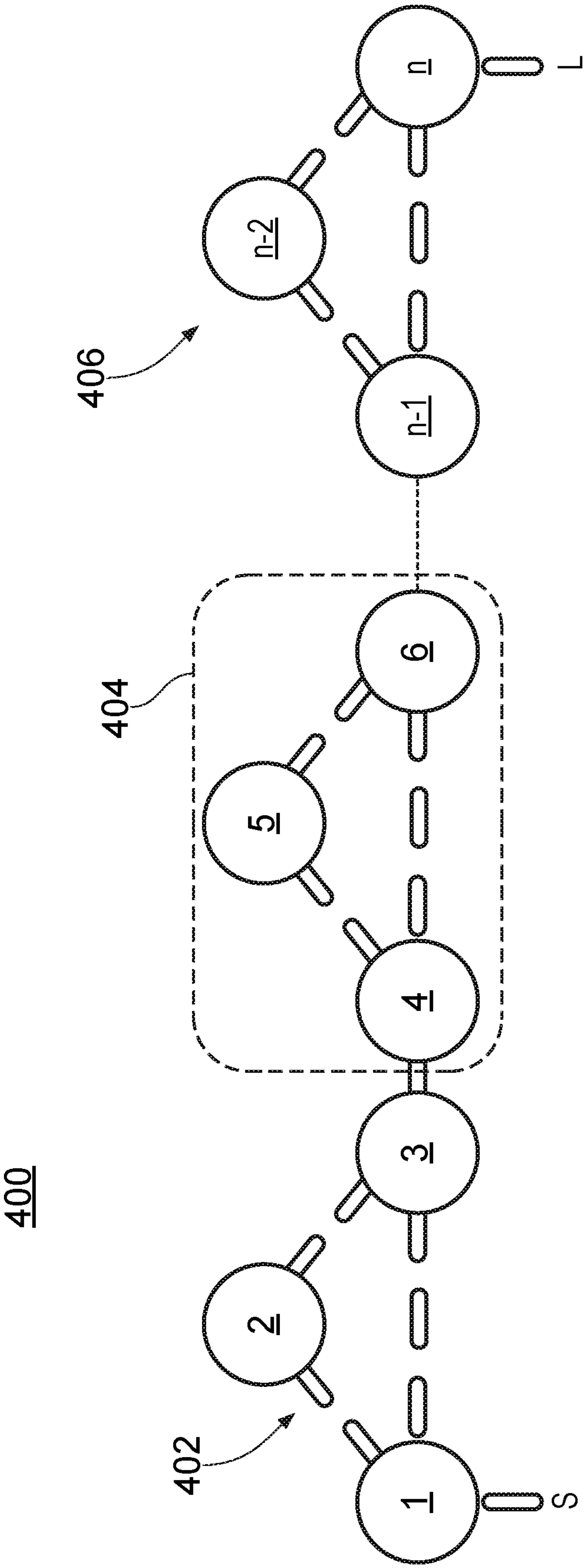
FIG. 4 is a schematic diagram showing the electromagnetic coupling of resonators in the cavity filters of FIGS. 2 and 3.

FIG. 4 is a schematic diagram showing the electromagnetic coupling of resonators in a cavity filter 400. The cavity filter 400 may correspond to the cavity filter 200 described above with respect to FIGS. 2 and 3, for example.

Each resonator is illustrated by a numbered circle. Electric-field coupling between resonators (whereby electromagnetic energy is transferred from one resonator to another primarily by the electric field) is shown by dashed lines. Magnetic-field coupling between resonators (whereby electromagnetic energy is transferred from one resonator to another primarily by the magnetic field) is shown by solid lines.

As shown in FIGS. 2 and 3, the topology of the filter 200 is based on a plurality of filtering modules each comprising a group of resonators (in the illustrated embodiment, triplets). The cavity filter 400 in FIG. 4 comprises a plurality of filtering modules comprising n resonators (where n is an integer equal to or greater than six), of which three filtering modules 402, 404, 406 are shown.

The input filtering module 402 receives a signal S for transmission. The output filtering module 406 outputs a signal to a load L. The illustrated embodiment further shows one or more intermediate filtering modules 404 coupled between the input and output filtering modules 402, 406. However, in other embodiments the filter 400 may comprise only input and output filtering modules 402, 406 (i.e. no intermediate filtering modules). The filtering modules 402, 404, 406 may be coupled in series (e.g., a linear chain of modules), such that each filtering module performs a respective filtering function and outputs a filtered signal to a subsequent module (or outputs the signal from the filter 400).

The resonators inside each triplet are misaligned to create electric cross-coupling between those resonators. The misalignment reduces the inter-resonator distance and thus the final volume of the triplet. Further, the cross-coupling means that each of the triplets provides a transmission zero. The transmission zero can be arbitrary located after or before the transmission band. The connection between filtering modules or triplets is made by a magnetic coupling.

Thus, the number of triplets will provide the number of the transmission zeroes and the number of resonators (three times the number of triplets) will be the number of poles. This topology, which provides a flexible number of transmission zeroes in filtering modules which are electrically isolated from each other, allows the overall filter performance to be synthesized and predicted straightforwardly using commercial software. Only the electric coupling between resonators in the same filtering module requires more complex calculation. Filter performance can be changed by adding or removing filtering modules (thus adding or removing a transmission zero) in a predictable way.

Figure 5:
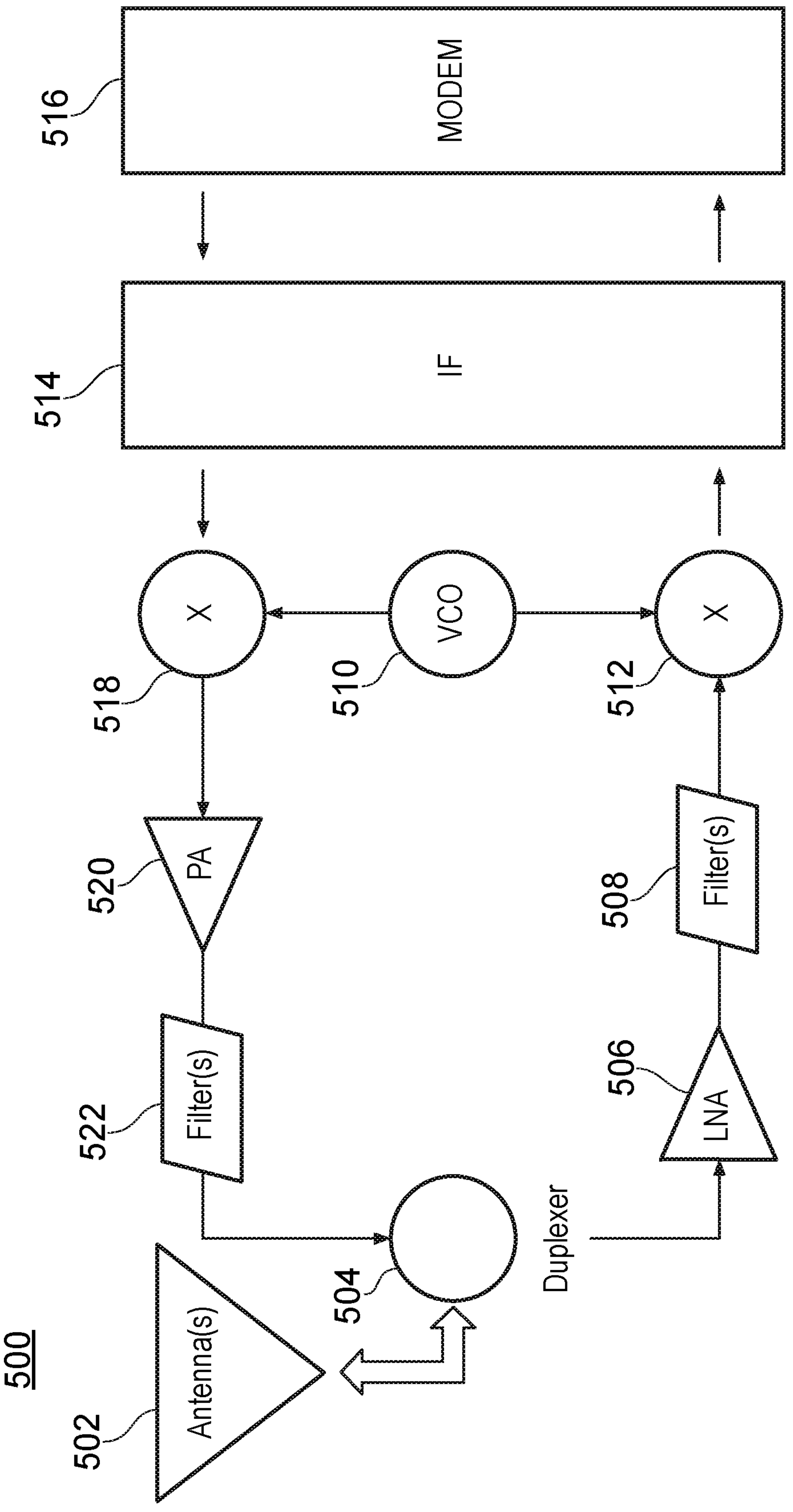
FIG. 5 shows a wireless transmission and reception apparatus according to embodiments of the disclosure.

FIG. 5 shows a wireless transmission and reception apparatus 500 according to embodiments of the disclosure. The apparatus 500 may be a radio access network node for a communications network, such as a base station (also known as a NodeB, eNodeB, gNodeB, etc).

The apparatus 500 comprises one or more antennas 502, configured to receive and/or transmit electromagnetic radio or microwave signals. The antennas 502 are coupled to a duplexer 504, which channels signals for transmission to the antennas 502 from a transmit chain, and received signals from the antennas 502 to a receive chain.

The receive chain comprises an amplifier 506, such as a low-noise amplifier (LNA), which is coupled to receive the received signals from the duplexer 504. The output of the amplifier 506 is provided to one or more filters 508, which filter the signals and provide the filtered signal to downconverter circuitry 512. The filters 508 may provide a band-pass filtering function such that one or more desired frequency bands are passed and other frequency bands are filtered from the signal. Where multiple filters 508 are provided, each filter may provide its own respective passband. The downconverter circuitry 512 is coupled to an oscillator 510, such as a voltage-controlled oscillator (VCO), and mixes (downconverts) the signal to an intermediate frequency. The filtered, downconverted signal is provided to a modem 516 or other processing circuitry via an interface (IF) 514.

The transmit chain comprises the modem 516 or other processing circuitry generating, at an intermediate frequency, signals to be transmitted and outputting those signals to upconverter circuitry 518 via the interface 514. The upconverter circuitry 518 mixes an output from the oscillator 510 with the signal to upconvert the signal from the intermediate frequency to a transmission frequency (e.g., microwave or radio). This upconverted signal is provided to an amplifier 520, such as a power amplifier (PA). The amplified signal is output from the amplifier 520 to one or more filters 522, which filter the signals and provide the filtered signal to the duplexer 504 for further output to the antennas 502 for transmission. The filters 522 may provide a band-pass filtering function such that one or more desired frequency bands are passed and other frequency bands are filtered from the signal. Where multiple filters 522 are provided, each filter may provide its own respective passband.

According to embodiments of the disclosure, one or more of the filters 508 and/or one or more of the filters 522 may correspond to any of the cavity filters 100, 200, 400 described above with respect to FIGS. 1 to 4. In some embodiments, each of the filters 508 and/or each of the filters 522 may correspond to any of the cavity filters 100, 200, 400.

The present disclosure thus provides cavity filters, filtering modules for such cavity filters and wireless transmission/reception apparatuses comprising such cavity filters. Cavity filters according to a first aspect are easy to tune and design through their use of multiple filtering modules. Cavity filters and/or filtering modules for such filters according to the second aspect comprise a cavity which includes planar resonators and thus helps to reduce the weight and/or volume of the filter. This design may be incorporated in the modular design of the first aspect, as one or more of the multiple filtering modules, or on its own in a cavity filter having only a single cavity.

It should be noted that the above-mentioned embodiments illustrate rather than limit the invention, and that those skilled in the art will be able to design many alternative embodiments without departing from the scope of the appended embodiments or the disclosure as a whole. The word "comprising" does not exclude the presence of elements or steps other than those listed in a claim, "a" or "an" does not exclude a plurality, and a single feature or other unit may fulfil the functions of several units.

The invention claimed is:

1. A filtering module for a cavity filter, the filtering module comprising:
- a housing defining an enclosed cavity, wherein a surface of the cavity is electromagnetically conductive; and
- a plurality of planar resonators arranged within the cavity, one or more of the resonators being rotatable about an axis of rotation so as to vary an electric-field coupling between the resonator and other resonators of the plurality of resonators.

2. The filtering module according to claim 1, wherein one or more of the plurality of resonators comprises a dielectric substrate and an electrically conductive track on the dielectric substrate.

3. The filtering module according to claim 2, wherein the dielectric substrate comprises ceramic.

4. The filtering module according to claim 2, wherein the dielectric substrate comprises a disc.

5. The filtering module according to claim 2, wherein the conductive track is open-ended at a first end of the track, and electrically connected to the surface of the cavity at a second end of the track.

6. The filtering module according to claim 2, wherein the conductive track is arranged in a straight line.

7. The filtering module according to claim 1, wherein the plurality of planar resonators are arranged coaxially along an axis of the cavity.

8. The filtering module according to claim 7, wherein the axis of rotation of the one or more resonators corresponds to the axis of the cavity.

9. The filtering module according to claim 7, wherein the cavity is cylindrical, and wherein the axis of the cavity is a longitudinal axis of the cylindrical cavity.

10. The filtering module according to claim 1, further comprising an input for receiving a signal to be filtered, and applying the signal to a first resonator of the plurality of resonators.

11. The filtering module according to claim 1, further comprising an output for receiving a filtered signal from a second resonator of the plurality of resonators and outputting the filtered signal from the filtering module.

12. A cavity filter, comprising:
- an input for receiving a signal to be filtered;
- a plurality of filtering modules, each filtering module comprising:
  - a cavity, wherein a surface of the cavity is electromagnetically conductive; and
  - a plurality of resonators arranged within the cavity, at least one of the resonators being movable so as to vary an electromagnetic coupling between the resonator and other resonators of the plurality of resonators; and
  - an output for outputting a filtered signal,
- wherein an input filtering module of the plurality of filtering modules is coupled to the input to receive the signal to be filtered,
- wherein each of the filtering modules is coupled to at least one other filtering module of the plurality of filtering modules via a magnetic coupling, and
- wherein an output filtering module of the plurality of filtering modules is coupled to the output and is configured to provide the filtered signal.

13. The cavity filter according to claim 12, wherein the plurality of filtering modules further comprises one or more intermediate filtering modules arranged between the input filtering module and the output filtering module.

14. The cavity filter according to claim 13, wherein the one or more intermediate filtering modules are arranged in series between the input filtering module and the output filtering module.

15. The cavity filter according to claim 12, wherein an output resonator and an input resonator of coupled filtering modules of the plurality of filtering modules are substantially aligned so as to provide the magnetic coupling.

16. The cavity filter according to claim 15, wherein the output resonator and the input resonator are aligned through an aperture in a housing between the coupled filtering modules.

17. The cavity filter according to claim 12, wherein the plurality of resonators of at least one filtering module of the plurality of filtering modules are planar.

18. The cavity filter according to claim 12, wherein one or more of the resonators of at least one filtering module of the plurality of filtering modules are rotatable about an axis of rotation so as to vary an electromagnetic coupling between the resonator and other resonators of the plurality of resonators.

19. The cavity filter according to claim 12, wherein one or more of the resonators of at least one filtering module of the plurality of filtering modules comprise a dielectric substrate and an electrically conductive track on the dielectric substrate.

* * * * *